United States Patent [19]

Quiring et al.

[11] Patent Number: 5,210,170
[45] Date of Patent: May 11, 1993

[54] PROCESS FOR STABILIZING PLASTICS CONTAINING ESTER GROUPS

[75] Inventors: Bernd Quiring, Leverkusen; Thomas Münzmay, Dormagen; Wolfgang Henning, Kuerten; Eduard Mayer, Dormagen; Walter Meckel, Neuss; Wilhelm Goyert, Leverkusen, all of Fed. Rep. of Germany

[73] Assignee: Bayer Aktiengesellschaft, Leverkusen, Fed. Rep. of Germany

[21] Appl. No.: 708,590

[22] Filed: May 31, 1991

[30] Foreign Application Priority Data

Jun. 7, 1990 [DE] Fed. Rep. of Germany ....... 4018184

[51] Int. Cl.$^5$ .................. C08L 75/02; C08L 77/12; C09K 15/18; C08K 5/29
[52] U.S. Cl. ................................ 528/80; 528/272; 528/81; 528/83; 252/182.2; 252/182.26
[58] Field of Search .............. 528/80, 81, 83, 272; 252/182.2, 182.26

[56] References Cited

U.S. PATENT DOCUMENTS

| | | | |
|---|---|---|---|
| 3,929,733 | 12/1975 | Alberino et al. | 528/67 |
| 4,064,103 | 12/1977 | Cordes et al. | 260/45.9 D |
| 4,067,820 | 1/1978 | Wagner et al. | 252/426 |
| 4,088,665 | 5/1978 | Findeisen et al. | 528/51 |
| 4,110,302 | 8/1978 | Thomas et al. | 524/13 |
| 4,172,936 | 10/1979 | Schäfer et al. | 528/49 |
| 4,174,433 | 11/1979 | Schäfer et al. | 528/49 |
| 4,192,925 | 3/1980 | Schäfer et al. | 528/78 |
| 4,248,978 | 2/1981 | de Cleur et al. | 525/124 |
| 4,260,554 | 4/1981 | Ohlinger et al. | 560/331 |
| 4,788,224 | 11/1988 | Müller et al. | 521/104 |
| 4,859,741 | 8/1989 | Takahashi et al. | 525/123 |
| 4,910,339 | 3/1990 | Henning et al. | 528/84 |

FOREIGN PATENT DOCUMENTS

| | | |
|---|---|---|
| 2743680 | 4/1979 | Fed. Rep. of Germany . |
| 3210746 | 2/1984 | Fed. Rep. of Germany . |
| 951505 | 3/1964 | United Kingdom . |

OTHER PUBLICATIONS

W. Neumann and P. Fischer, Angewandte Chemie 74 (1962), pp. 801–806.

*Primary Examiner*—John Kight, III
*Assistant Examiner*—Jeffrey Culpeper Mullis
*Attorney, Agent, or Firm*—Joseph C. Gil; Richard E. L. Henderson

[57] ABSTRACT

The invention relates to a process for stabilizing ester-containing plastics against degradation by heat and/or hydrolysis by the incorporation of sterically hindered isocyanate-terminated carbodiimides. The incorporable carbodiimides produce an excellent anti-aging effect and do not give rise to volatile products, even at very high temperatures.

17 Claims, No Drawings

PROCESS FOR STABILIZING PLASTICS CONTAINING ESTER GROUPS

BACKGROUND OF THE INVENTION

The use of carbodiimides containing sterically hindered carbodiimide groups particularly as antiagers and, more particularly, as hydrolysis stabilizers for polyester polyurethanes is known. German Offenlegungsschrift 2,543,920. Such carbodiimides are generally obtained by condensation of monoisocyanates or of a mixture of mono- and polyisocyanates and are commercially available, for example, under the name Stabaxol (supplier Rheinchemie). Their hydrolysis-stabilizing effect is attributed to the reaction with free carboxyl groups (for example, from the adipic acid of the polyester) to acyl ureas. See, for example, W. Neumann and P. Fischer, *Angewandte Chemie*, 74 (1962), pages 801 et seq. Under certain conditions (for example, when polyurethanes stabilized with such carbodiimides are not properly processed), products that can adversely affect the health of the processor or user are released.

It is known that oligocarbodiimides and polycarbodiimides can be used as stabilizers, for example, for terephthalate fibers. In addition, carbodiimides and derivatives thereof, which may still contain, for example, free isocyanate groups, are known as modifiers for polyisocyanates and polyurethane foams. They are generally added to obtain certain physical properties, for example, a reduction in melting point. See, for example, German Auslegeschrift 2,837,770, U.S. Pat. No. 4,067,820, and German Offenlegungsschriften 2,714,292 and 2,714,293).

The object was to provide antiagers, in particular hydrolysis stabilizers, for plastics contain ester groups which, despite high activity, would not release volatile, possibly noxious, substances under conditions encountered during either processing or use.

SUMMARY OF THE INVENTION

The present invention relates to a process for stabilizing polyester-containing plastics against thermal and/or hydrolytic degradation comprising reacting a polyester with functional groups and an incorporable, sterically hindered carbodiimide corresponding to the formula

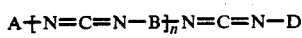

wherein

A and D are the same or different $C_{6-20}$ aromatic or araliphatic hydrocarbon groups wherein in each group A and D
  (1) the carbodiimide group is attached to an aromatic ring carbon atom,
  (2) at least one aromatic ring position ortho to the carbodiimide group is substituted with at least one aromatic (including aryl and aralkyl), aliphatic, and/or cycloaliphatic substituent containing at least 2 carbon atoms (preferably a branched or cyclic aliphatic group containing at least 3 carbon atoms), and
  (3) at least one NCO group is attached to one or more aromatic ring carbon atoms;

is a $C_{6-20}$ aromatic or araliphatic hydrocarbon group wherein in each group B
  (1) each carbodiimide group is attached to an aromatic ring carbon atom, and
  (2) at least one aromatic ring position ortho to a carbodiimide group is substituted with at least one aromatic (including aryl and aralkyl), aliphatic, and/or cycloaliphatic substituent containing at least 2 carbon atoms (preferably a branched or cyclic aliphatic group containing at least 3 carbon atoms); and n is 0 to 3 (on average) (preferably 0 (on average)).

DETAILED DESCRIPTION OF THE INVENTION

Polyester-containing plastics that can be stabilized according to the invention include polyterephthalates, polyether esters, polyester amides, ester-group-containing polyether polyamides, polycaprolactones, and polyurethanes (by which are also meant polyester urethane ureas and polyester polyureas).

The carbodiimides containing NCO groups according to the invention are distinguished by a particularly good hydrolysis-stabilizing effect. Polyester products stabilized with these products do not release volatile components emanating from the carbodiimide stabilizers of the invention, even at temperatures above 200° C. (i.e., under normal processing conditions). The carbodiimides containing isocyanate groups used in accordance with the invention, which correspond to the formula

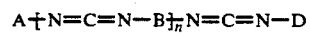

where A, B, D and n are as defined above, may be produced by known methods. One possible process for their production is described, for example, in German Auslegeschrift 2,537,685. According to the teaching of this patent specification, organic polyisocyanates are partly reacted to the desired degree in the presence of a suitable phosphorus compound and the catalyst is subsequently deactivated with a suitable halide (for example, an acid halide).

Suitable antiagers according to the invention include any aromatic mono- and oligocarbodiimides containing isocyanate groups corresponding to the formula

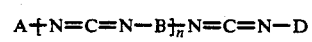

where A, B, D and n are as defined above. Preferred compounds are those in which the aromatic substituents A and B are substituted by (cyclo)aliphatic and/or aromatic groups in both aromatic ring positions ortho to each carbodiimide group, particularly where one of the substituents in the ortho position is a methyl group, and n is 0 or 1. Particularly preferred compounds are those in which the aromatic rings A, D and B are substituted by (cyclo)aliphatic groups in both aromatic ring positions adjacent to each carbodiimide group, one of the substituents in the ortho position is a methyl group and the other contains at least 2 carbon atoms, and n is, on average, approximately 0.

Especially preferred carbodiimides are those containing approximately two isocyanate groups which, in the aromatic ring position adjacent to the carbodiimide group, contain two substituents, at least one of which is a branched aliphatic chain containing at least 3 carbon atoms or a cycloaliphatic chain containing at least 5 carbon atoms, and n is, on average, approximately 0.

Suitable carbodiimides containing isocyanate groups for use in accordance with the invention may be prepared, for example, from one or different diisocyanates based on substituted benzene, diphenylmethane, or naphthalene by the process mentioned above. Suitable substituents adjacent to the carbodiimide group on the aromatic ring include $C_{2-20}$ alkyl and/or cycloalkyl groups, such as ethyl, propyl, isopropyl, sec-butyl, tert-butyl, cyclohexyl, and dodecyl, and aryl and aralkyl groups containing 6 to 15 carbon atoms, such as phenyl, tolyl, benzyl, naphthyl, and the like. These groups may also bear substituents which do not react with isocyanate groups or Zerewitinoff-active groups under normal conditions, such as halogen, ether groups, ester groups, and the like. Particularly preferred diisocyanates are diethyl toluene diisocyanates (particularly 2,6-diethyl-1,3-diisocyanato-4-methylbenzene and 4,6-diethyl-1,3-diisocyanato- 2-methylbenzene) and isomer mixtures thereof, triisopropyl phenylene diisocyanates (particularly 2,4-diisocyanato-1,3,5-tri(1-methylethyl)-benzene), 4,4'-diisocyanato-3,3',5,5'-tetraethyldiphenylmethane, and 4,4'-diisocyanato-3,3',5,5'-tetraisopropyldiphenylmethane.

The process according to the invention is preferably carried out using about 0.2 to about 8% by weight (preferably 0.5 to 5% by weight) of a sterically hindered carbodiimide of the invention.

Suitable plastics containing ester groups to be stabilized in accordance with the invention are of the type known for use in adhesives, coating compounds, fibers, articles of optionally cellular cast elastomers, and thermoplastic processing.

A precondition for the effectiveness of the isocyanate-containing carbodiimides according to the invention is the possibility that carboxylic acids can be formed during thermal and/or hydrolytic degradation of the polymers. Polyester plastics stabilized in accordance with the invention practically do not release toxic, volatile substances emanating from the stabilizers used in accordance with the invention either at elevated temperature (for example, under normal processing conditions) or at room temperature. Such materials do, of course, decompose at very high temperatures not normally encountered during processing. The esters (that is, preferably the polyhydroxyl polyesters) used in the process of the invention, which are the principal constituent or an essential component of plastics, include reaction products of polyhydric (preferably dihydric and even trihydric) alcohols with polybasic (preferably dibasic) carboxylic acids. Instead of using the free polycarboxylic acids in the preparation of the polyesters, it is also possible to use the corresponding polycarboxylic anhydrides or corresponding polycarboxylic acid esters of lower alcohols or mixtures thereof. Suitable polycarboxylic acids can be aliphatic, cycloaliphatic, araliphatic, aromatic, and/or heterocyclic and may optionally be substituted (for example, by halogen atoms) and/or unsaturated. Examples of suitable carboxylic acids and derivatives thereof include succinic acid, adipic acid, suberic acid, azelaic acid, sebacic acid, dodecanedioic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimerized and trimerized unsaturated fatty acids, optionally in admixture with monomeric unsaturated fatty acids such as oleic acid; and terephthalic acid dimethyl ester and terephthalic acid bis-glycol ester. Suitable polyhydric alcohols include ethylene glycol, 1,2- and 1,3-propylene glycol, 1,4-, 1,3- and 2,3-butylene glycol, 1,6-hexanediol, 1,8-octanediol, neopentyl glycol, 1,4-bis(hydroxymethyl)-cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, and dibutylene glycol and higher polybutylene glycols having molecular weights of up to about 10,000. The polyesters may in part contain terminal carboxyl groups. Polyesters of lactones, such as $\epsilon$-caprolactone, or of hydroxycarboxylic acids, such as $\epsilon$-hydroxycaproic acid, may also be used.

Suitable "polyesters" include polyester amides and, optionally, polyamides, such as the predominantly linear condensates obtained from polybasic saturated or unsaturated carboxylic acids or anhydrides thereof and polyhydric saturated or unsaturated amino alcohols, diamines, polyamines, and mixtures thereof and mixtures thereof with the above-mentioned polyalcohols. Polyester compounds already containing urethane or urea groups and optionally modified natural polyesters, such as castor oil, are also to be understood as "polyesters" in the context of the invention.

Polyester urethanes that are stabilized in accordance with the invention are known. Such polyester urethanes can be synthesized from the polyester described above having average molecular weights of 500 to about 10,000; optionally, other relatively high molecular weight polyols and/or polyamines, such as polyethers, polycarbonates, polybutadiene di- or polyol(amine) containing on average 1.5 to 5 (preferably about 2 to 3) Zerewitinoff-active groups in the molecule; aromatic, araliphatic, aliphatic, and/or cycloaliphatic polyisocyanates containing on average approximately 1.5 to 5 (preferably approximately 2 to 3 and more preferably approximately 2) isocyanate groups in the molecule; and, optionally, short-chain chain-extending agents, such as diols, polyols, diamines, polyamines and/or aminoalcohols.

Before being used in the polyisocyanate polyaddition process, the polyhydroxyl compounds mentioned can be modified in various ways. Thus, according to German Offenlegungsschrift 2,210,839 (U.S. Pat. No. 3,849,515) and German Offenlegungsschrift 2,544,195, a mixture of different polyhydroxyl compounds (for example, of one or more polyester polyols) may be condensed by etherification in the presence of a strong acid to form a relatively high molecular weight polyol made up of various segments attached by ether brides. It is also possible to introduce amide groups into the polyhydroxyl compounds, for example, in accordance with German Offenlegungsschrift 2,559,372 or to introduce triazine groups into the polyhydroxyl compounds by reaction with polyfunctional cyanic acid esters in accordance with German Offenlegungsschrift 2,620,487.

It is sometimes particularly advantageous to convert the relatively high molecular weight polyhydroxyl compounds completely or partly into the corresponding anthranilic acid esters by reaction with isatoic anhydride, as described in German Offenlegungsschriften 2,019,432 and 2,619,840 and in U.S. Pat. Nos. 3,808,250, 3,975,428, and 4,016,143. Relatively high molecular weight compounds terminated by aromatic amino groups can be obtained in this way.

According to German Offenlegungsschrift 2,546,536 and U.S. Pat. No. 3,865,791, relatively high molecular weight compounds terminated by amino groups can be obtained by reaction of NCO prepolymers with enamines, aldimines, or ketimines containing hydroxyl groups, followed by hydrolysis. Other processes for the preparation of relatively high molecular weight ester compounds terminated by amino groups or hydrazide groups are described, for example, in German Offenlegungsschrift 1,694,152 (U.S. Pat. No. 3,625,871).

In the process of the invention, it is even possible to use polyhydroxyl compounds containing high molecular weight polyadducts or polycondensates or polymers in finely dispersed or dissolved form. Polyhydroxyl compounds such as these are obtained, for example, by carrying out polyaddition reactions (for example, reactions between polyisocyanates and aminofunctional compounds) or polycondensation reactions (for example, between formaldehyde and phenols and/or amines) in situ in the polyesters mentioned above. Such processes are described, for example, in German Auslegeschriften 1,168,075 and 1,260,142 and in German Offenlegungsschriften 2,324,134, 2,423,984, 2,512,385, 2,513,815, 2,550,796, 2,550,797, 2,550,833, 2,550,862, 2,633,293, and 2,639,254. However, it is also possible in accordance with U.S. Pat. No. 3,869,413 or German Offenlegungsschrift 2,550,860 to mix an already formed aqueous polymer dispersion with a polyhydroxyl compound and subsequently to remove the water from the mixture. The precondition for the effectiveness of the carbodiimides containing isocyanate groups used in accordance with the invention is the possibility that carboxylic acids may be formed during thermal or hydrolytic degradation of the polyurethanes.

Other plastics suitable for stabilization in accordance with the invention are polyterephthalates, which can be synthesized, for example, from terephthalic acid dimethyl ester or other such terephthalate esters, and butanediol and/or ethanediol and may also incorporate other components, such as diols and/or dicarboxylic acids, and which have average molecular weights ($M_n$) of at least 10,000. Particularly suitable polyterephthalates include polybutylene terephthalate and polyethylene terephthalate. Materials such as these are used as high-quality synthetic materials or fibers. In elasticized form, they may even contain relatively large proportions of a relatively long-chain diol, such as a $C_4$ polyether. Products such as these are commercially available, for example, under the name Hytrel (available from Du Pont).

Other products suitable for stabilization in accordance with the invention include commercially available polyamides containing polyester blocks and polyether polyamides containing ester groups, or basically any plastics containing ester groups, preferably those containing ester groups in the main chain.

Plastics containing polyesters stabilized in accordance with the invention practically do not release toxic, volatile, and possibly noxious substances either at elevated temperatures (for example, under processing conditions) or at room temperature and, accordingly, are preferred for toxicological reasons over materials stabilized in accordance with the prior art. It is surprising that the carbodiimides containing isocyanate groups when used in accordance with the invention are distinctly more effective stabilizers than carbodiimidecontaining reaction products with low molecular weight alcohols, such as for example butanediol or stearyl alcohol. The good stabilizing effect of the monocarbodiimides containing isocyanate groups is particularly surprising.

The polyester-containing plastics stabilized in accordance with the invention may be prepared by various methods, including, for example, a single-stage reaction in which all the components (including additives, if any) are mixed and allowed to react with one another. The reaction may also be carried out in several steps. The sterically hindered aromatic carbodiimide containing isocyanate groups can even be incorporated in a melt of the fully reacted polymer. In one preferred embodiment, the polyhydroxyl polyester is reacted in a first step with a nonstoichiometric amount (based on the NCO groups) of the isocyanate-containing carbodiimide according to the invention and the resultant intermediate subsequently converted to the polyester-containing polymer. For example, a second step could involve a reaction or mixing with compounds having Zerewitinoff-active group (including additional quantities of the polyhydroxyl polyester, polyols or polyamines, and/or chainextending agents as mentioned above) and/or reaction with polyisocyanates depending on the stoichiometry of the first step and/or the stoichiometry of the mixture of the second step.

Polymers stabilized in accordance with the invention may contain additives such as wax, fillers (including, for example fibers), pigments, dyes, flameproofing agents, and processing aids. They may also be blended with other plastics, particularly when certain properties are to be obtained. They may be processed in one-component and multicomponent form from solution or dispersion (emulsion or suspension) or in bulk, optionally in the presence of blowing agents.

The end products have outstanding mechanical properties and can be used for elastic coatings (for example, for textiles and plastics which preferably form elastomers) and for extruded and injection-molded articles. They may even be sintered, for example as powders, to form coatings, and can be used as adhesives, as cast resins, as polyurethane elastomers suitable for application by rolling, spraying, and casting, more particularly as optionally cellular cast polyurethane systems based on napthalene-1,5-diisocyanate, and as fibers. The potential applications for the end products of the process according to the invention are known.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example A Preparation of diisocyanates containing carbodiimide groups

General procedure:

Approximately 300 to 500 parts by weight of each diisocyanate were introduced into a 1 liter round-bottomed flask equipped with a stirrer, thermometer, and reflux condenser. The reaction vessel was blanketed with nitrogen and heated to 120° C. Phospholine oxide (mixture of 1-methyl-1-phospha-2-cyclopent-1-ene oxide and 1-methyl-1-phospha 3-cyclopent-1-ene oxide) (0.1% by weight was introduced into the diisocyanate at 120° C. as a 25% solution in N-methylpyrrolidone. The progress of the reaction was followed by monitoring the isocyanate content. When the desired isocyanate content was reached, the reaction was terminated by cooling to 60° C. and adding of 0.5% by weight phosphorus trichloride. The resultant product was cooled to room temperature.

TABLE 1

Diisocyanatocarbodiimides

| Example | Diisocyanate | Isocyanate content (%) |
|---|---|---|
| A1 | Toluene diisocyanate (DESMODUR T 80, Bayer AG) | 27.7 |
| A2 | TRIDI[1] | 16.0 |
| A3 | TRIDI[1] | 7.9 |
| A4 | TRIDI[1] | 21.1 |
| A5 | DETDI[2] | 8.7 |
| A6 | DETDI[2] | 18.6 |
| A7 | TRIDI[1] | 15.8 |
| A12 | 4,4'diisocyanato-3,3',5,5'-tetraisopropyldiphenylmethane | 11.1 |

[1]2,4-diisocyanato-1,3,5-tris(1-methylethyl)benzene
[2]70:30 mixture of 2,6-diethyl-1,3-diisocyanato-4-methylbenzene and 4,6-diethyl-1,3-diisocyanato-2-methylbenzene

Example A8

The diisocyanatocarbodiimide prepared in accordance with Example A1 (100 parts by weight) was introduced into 180 parts by weight 1,4-butanediol over a period of 30 minutes at 90° C. After another 45 minutes at 90° C., the reaction mixture was isocyanate-free. The product had a hydroxyl group content of 20.2%.

Example A9

The diisocyanatocarbodiimide prepared in accordance with Example A2 (264 parts by weight) was reacted with 284 parts by weight stearyl isocyanate at 120° C. in the presence of 1 part by weight phospholine oxide (a) (see general procedure). After 15 hours, the reaction mixture was isocyanate-free

Example A10

The diisocyanatocarbodiimide prepared in accordance with Example A6 (206 parts by weight) was reacted with 245 parts by weight stearyl alcohol at 70° C. After 3 hours, the product was isocyanate-free

Example A11

The diisocyanatocarbodiimide prepared in accordance with Example A7 (370 parts by weight) was reacted with 284.5 parts by weight 1,4-butanediol at 100° C. After 1 hour, the mixture was isocyanate-free. The resulting product had a hydroxyl group content of 15.6%.

Example B Preparation and testing of the stabilized polyurethanes

Comparison Example B1

An anhydrous polybutanediol adipate (250 parts by weight) having an average molecular weight of 2,000 (OH value of 56 mg KOH/g, acid value of 0.7 mg KOH/g), 1,4-butanediol (22.4 parts by weight), the product of Example A1 (2.5 parts by weight), and ethylene bis-stearyl amide (1.5 parts by weight) were mixed at 80° C. Diphenylmethane-4,4'-diisocyanate (98 parts by weight) was then added and the mixture was vigorously stirred for 30 seconds. The reacting mixture was poured into a Teflon pan and kept at 120° C. for 2 hours and then at 70° C. for 15 hours. The cooled product was granulated and injection molded to test specimens (DIN S1 rods). The test specimens were stored in water at 80° C. At intervals of 1 week or, when longer storage times were used, at intervals of 2 weeks, 3 to 5 test specimens were dried and tested for tensile strength. Composition and results are shown in Tables 2 and 3.

Examples B2-B24

Products were prepared in the same way as described in Comparison Example B1 using carbodiimides according to Example A. The compositions and possible process variants are shown in Table 2 and further explained in the associated footnotes.

The tensile strengths after aging in water for different periods at 80° C. are shown in Table 3.

TABLE 2

Composition of the polyurethanes of Examples B1–B28 (parts by weight)

| | Example B: | | | | | | | | | |
|---|---|---|---|---|---|---|---|---|---|---|
| | 1 | 2 | 3 | 4 | 5 | 6 | 7 | 8 | 9 | 10 |
| Polybutanediol adipate[1] | 250 | 250 | 250 | 250 | 250 | 250 | 250 | 250 | 250 | 250 |
| 1,4-Butanediol | 22.4 | 22.0 | 23.8 | 23.8 | 21.5 | 22.5 | 22.5 | 22.5 | 22.5 | 22.5 |
| Carbodiimide of Example A | A1 | A8 | A9 | A10 | A11 | A2 | A2 | A2 | A2 | A2 |
| Parts by weight carbodiimide | 2.5 | 3.34 | 2.34 | 3.1 | 5.4 | 2.59 | 3.89 | 5.18 | 7.78 | 10.35 |
| 4,4'-Diphenylmethane diisocyanate | 98 | 98 | 97.4 | 99.1 | 98.0 | 94.3 | 93.7 | 93.0 | 91.7 | 90.4 |
| Ethylene bis-stearyl amide | 1.5 | 1.5 | 1.5 | 1.5 | 1.5 | 1.5 | 1.5 | 1.5 | 1.5 | 1.5 |
| Content of carbodiimide groups (relative) | 0.75 | 1 | 1 | 1 | 1 | 0.5 | 0.75 | 1 | 1.5 | 2 |

| | Example B: | | | | | | | | | |
|---|---|---|---|---|---|---|---|---|---|---|
| | 11[2] | 12 | 13 | 14 | 15 | 16 | 17 | 18 | 19 | 20[2] |
| Polybutanediol adipate[1] | 250 | 250 | 250 | 250 | 250 | 227 | 227 | 227 | 227 | 182 |
| 1,4-Butanediol | 22.5 | 22.5 | 22.5 | 22.5 | 23.75 | 23.75 | 23.75 | 23.7 | 23.7 | 19 |
| Carbodiimide of Example A | A3 | A3 | A3 | A3 | A4 | A5 | A5 | A5 | A5 | A6 |
| Parts by weight carbodiimide | 1.7 | 2.55 | 3.4 | 6.8 | 6.2 | 0.9 | 1.3 | 1.76 | 3.5 | 1.3 |
| 4,4'-Diphenylmethane diisocyanate | 95.6 | 95.6 | 95.6 | 95.6 | 95.2 | 96.3 | 96.3 | 96.3 | 96.3 | 76.3 |
| Ethylene bis-stearyl amide | 1.5 | 1.5 | 1.5 | 1.5 | 1.5 | 1.2 | 1.2 | 1.2 | 1.2 | 1.2 |
| Content of carbodiimide groups (relative) | 0.5 | 0.75 | 1 | 2 | 1 | 0.5 | 0.75 | 1 | 2 | 0.5 |

| | Example B: | | | | | | | |
|---|---|---|---|---|---|---|---|---|
| | 21 | 22 | 23 | 24 | 25 | 26 | 27 | 28 |

TABLE 2-continued

Composition of the polyurethanes of Examples B1-B28 (parts by weight)

| Polybutanediol adipate[1] | 182 | 182 | 250[3] | 250[3] | 150 | 150 | 150 | 150 |
|---|---|---|---|---|---|---|---|---|
| 1,4-Butanediol | 19 | 19 | 23.75 | 23.75 | 14.25 | 14.25 | 14.25 | 14.25 |
| Carbodiimide of Example A | A6 | A6 | A2 | — | A12 | A12 | A12 | A12 |
| Parts by weight carbodiimide | 2 | 5.3 | 4.46 | — | 3.1 | 4.65 | 6.2 | 9.3 |
| 4,4'-Diphenylmethane diisocyanate | 75.8 | 74.0 | 97.1 | 99.2 | 53 | 53 | 53 | 53 |
| Ethylene bis-stearyl amide | 1.2 | 1.2 | — | — | 0.9 | 0.9 | 0.9 | 0.9 |
| Content of carbodiimide groups (relative) | 0.75 | 2.0 | 1 | 0 | 0.5 | 0.75 | 1 | 1.5 |

[1]Average molecular weight of 2,000 (OH value of 56, acid value of 0.7)
[2]The polybutanediol adipate was first stirred with the carbodiimide of Example A at 80° C. until no more free NCO was present. Subsequent steps were as described in Example B1.
[3]Polyethanediol butanediol adipate having an average molecular weight of about 2,000

TABLE 3

Tensile strengths (MPa) after storage in distilled water at 80° C.

| Example | 0 | 7 | 14 | 21 | 28 | 42 |
|---|---|---|---|---|---|---|
| B1 | 57.4 | 34.8 | 8.1 | d. | d. | d. |
| B2 | 53.9 | 38.1 | 11.8 | d. | d. | d. |
| B3 | 50.9 | 44.8 | 33.5 | 21.1 | 2.8 | d. |
| B4 | 50.7 | 53.0 | 52.6 |  | 21.6 | d. |
| B5 | 40.5 | 36.7 | 28.1 | 11.1 | 1.6 | d. |
| B6 | 35.0 | 31.2 | 28.4 | 26.6 | 16.4 | 2.3 |
| B7 | 33.3 | 32.8 | 32.1 | 32.4 | 29.8 | 16.5 |
| B8 | 33.6 | 35.1 | 34.7 | 34.5 | 33.2 | 30.6 |
| B9 | 28.4 | 28.0 | 29.3 | 30.8 | 28.0 | 30.1 |
| B10 | 24.4 | 26.6 | 27.7 | 26.6 | 27.8 | 28.4 |
| B11 | 30.6 | 28.8 | 22.6 | 9.5 | 3.5 | d. |
| B12 | 38.5 | 34.3 | 24.8 | 14.5 | 3.9 | d. |
| B13 | 35.7 | 34.8 | 37.1 | 33.4 | 29.8 | 10.5 |
| B14 | 36.6 | 33.4 | 33.2 | 30.8 | 35.2 | 18.4 |
| B15 | 39.1 | 36.4 | 26.2 | 16.0 | 3.8 | d. |
| B16 | 40.6 | 36.7 | 27.0 | 10.9 | 3.5 | d. |
| B17 | 43.8 | 38.3 | 36.8 | 38.8 | 34.3 | 2.9 |
| B18 | 41.8 | 34.9 | 37.1 | 36.6 | 34.7 | 2.5 |
| B19 | 42.8 | 35.1 | 37.0 | 37.7 | 33.4 | 5.6 |
| B20 | 43.6 | 38.3 | 35.3 | 34.2 | 35.4 | 10.5 |
| B21 | 40.5 | 37.0 | 33.8 | 35.6 | 36.9 | 10.0 |
| B22 | 39.3 | 33.2 | 33.8 | 34.4 | 32.5 | 13.0 |
| B23 | 24.8 | 16.9 | 16.5 | 13.3 | 5.7 | 3.2 |
| B24 | 30.2 | 8.8 | 2.6 | d. |  |  |
| B25 | 35.2 | 29.9 | 35.0 | 33.5 | 38.8 | 12.3 |
| B26 | 38.9 | 32.9 | 37.7 | 36.5 | 30.7 | 4.5 |
| B27 | 41.5 | 36.8 | 35.2 | 29.9 | 25.2 | 2.5 |
| B28 | 35.0 | 26.4 | 30.1 | 31.8 | 38.9 | 21.9 | d. denotes decomposition.

Example 29

A. Unstabilized polybutylene terephthalate was extruded using a laboratory extruder (L:D of 25, compression continuously increasing, ratio of 1:3).

B. The procedure was as described in Example 29A, except that 1 part by weight of the product described in Example A2 was applied to the polybutylene terephthalate before extrusion by tumbling in a drum.

The products of Examples 29A and B were stored in distilled water for 13 hours at 100° C. and then dried. The melt index was determined at 250° C. in a high-pressure capillary viscosimeter of the HKV 2000 type (manufacturer Göttfert) after residence times of 5, 10, 15, and 20 minutes under a pressure of 2.45 bar (nozzle 15 mm long and 1 mm in diameter) and extrapolated to a residence time 0 to determine the intrinsic melt index ("IMI").

| Product of | IMI (g/10 min) |
|---|---|
| Ex. 29A, untreated | 54 |
| Ex. 29A, 13 hours at 100° C. (in water) | 76 |
| Ex. 29B, untreated | 13 |
| Ex. 29B, 13 hours at 100° C. (in water) | 15 |

The intrinsic melt indices show that, in contrast to the untreated product, the molecular weight of the product treated in accordance with the invention was hardly affected (intrinsic melt index) by the influence of water.

Example 30 Standard cast polyurethane without hydrolysis stabilizer (Comparison)

A polyester of adipic acid and ethylene glycol (100 parts by weight) having an average molecular weight of 2,000 and an OH value of 56 was dehydrated for 1 hour in a vacuum of about 40 mm Hg and then kept at approximately 125° C. (size of the batch approximately 500 g polyester). 1,5-Diisocyanatonaphthalene (18 parts by weight) was then added with stirring. After approximately 2 minutes, a vacuum of approximately 40 mm Hg was applied. After the exothermic reaction ended (about 15 minutes), 1,4-butanediol (2 parts by weight) was added with vigorous stirring. The product was then crosslinked for about 30 seconds and poured into a mold preheated to 100° C. The mixture remained pourable for about 150 seconds and could be demolded after about 20 minutes.

The elastomer was heated for 24 hours at 110° C. Thereafter it has the properties shown in Table 4 (see Example 30).

Tensile strength was remeasured after storage in water for 10 days at 80° C. (S1 test specimen according to DIN 53,504). Test results are shown in Table 5.

Examples 31-35 Hydrolysis stabilization of polyurethane elastomers according to the invention The NCO prepolymer was prepared in the same way as in Example 30. After the exothermic reaction ended, various quantities of the carbodiimide diisocyanate of Example A2 were introduced into the NCO prepolymer (see Table 6, Examples 31-35) and stirred in for about 15 minutes. 1,4-Butanediol (2 parts by weight) were then added with vigorous stirring and the reaction mixture was then processed in the same way as in Example 30. Shore hardness and modulus at 100% elongation fell slightly with increasing quantity of the carbodiimide diisocyanate of Example A2, but the values were still acceptable with 1.5 and 2 parts by weight carbodiimide. In contrast, resilience (compression set) was favorably influenced by carbodiimide contents of 1.2 to 2.2 parts by weight.

The stabilizing effect of this carbodiimide was reflected in the tensile strength values after storage in water for 10 days (see Table 5). The optimally effective quantity of this carbodiimide was about 1.5 to 2 parts by weight per 100 parts by weight polyester (see Table 5).

TABLE 4

Physical test data of Examples 30-35

| | Test Method | Examples | | | | | |
| --- | --- | --- | --- | --- | --- | --- | --- |
| | | 30 | 31 | 32 | 33 | 34 | 35 |
| Shore A hardness | DIN 53,505 | 87 | 87 | 87 | 85 | 83 | 82 |
| Modulus at 100% elongation (MPa) | DIN 53,504 | 5.0 | 5.0 | 4.9 | 4.6 | 4.3 | 4.2 |
| Modulus at 300% elongation (MPa) | DIN 53,504 | 10.2 | 10.3 | 9.9 | 9.0 | 8.9 | 8.7 |
| Tensile strength (MPa) | DIN 53,504 | 50.4 | 55.1 | 57.8 | 50.1 | 50.1 | 53.9 |
| Elongation at break (%) | DIN 53,504 | 793 | 679 | 780 | 684 | 720 | 711 |
| Compression set, 24 h/70° C. (%) | DIN 53,517 | 39 | 33 | 34 | 31 | 34 | 47 |

TABLE 5

Reduction in tensile strength (MPa) upon storage in water at 80° C.

| Example | Test method | Storage time | |
| --- | --- | --- | --- |
| | | 0 days | 10 days |
| 30 | DIN 53,504 | 50.4 | 3.8 |
| 31 | DIN 53,504 | 55.1 | 13.5 |
| 32 | DIN 53,504 | 57.8 | 17.1 |
| 33 | DIN 53,504 | 50.1 | 19.0 |
| 34 | DIN 53,504 | 50.1 | 15.8 |
| 35 | DIN 53,504 | 53.9 | 14.2 |

TABLE 6

Formulations of Examples 30-35

| Formulation ingredients (parts by weight) | Examples | | | | | |
| --- | --- | --- | --- | --- | --- | --- |
| | 30 | 31 | 32 | 33 | 34 | 35 |
| Ethanediol adipate | 100 | 100 | 100 | 100 | 100 | 100 |
| 1,5-Diisocyanato-naphthalene | 18 | 18 | 18 | 18 | 18 | 18 |
| 1,4-Butanediol | 2 | 2 | 2 | 2 | 2 | 2 |
| Carbodiimide diisocyanate of Example A2 | 0 | 1.2 | 1.5 | 2.0 | 2.2 | 3.0 |

As can be seen from Tables 2 and 5, the carbodiimides containing isocyanate groups exhibited an excellent anti-aging effect that was superior to that of the butanediol-terminated carbodiimides and to that of the carbodiimides with no other reactive groups. The anti-aging effect was particularly good when the carbodiimide containing isocyanate groups contained on average only one carbodiimide group per molecule and when one substituent at the aromatic ring was branched in the position adjacent to the carbodiimide group.

What is claimed is:

1. A process for stabilizing polyester-containing plastics against thermal and/or hydrolytic degradation comprising reacting a polyester having hydroxyl, amine, or hydrazide functional groups or a combination of said functional groups and an incorporable, sterically hindered carbodiimide corresponding to the formula

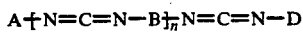

wherein
A and D are the same or different substituted $C_{6-20}$ aromatic or araliphatic hydrocarbon groups wherein in each group A and D
(1) the carbodiimide group is attached to an aromatic ring carbon atom of said $C_{6-20}$ aromatic or araliphatic hydrocarbon group,
(2) one or two aromatic ring positions of said $C_{6-20}$ aromatic or araliphatic hydrocarbon group ortho to the carbodiimide group are substituted with an aromatic substituent containing 6 to 15 carbon atoms, an aliphatic substituent containing 2 to 20 carbon atoms, or a cycloaliphatic substituent containing 5 to 20 carbon atoms, or a combination thereof, and
(3) an NCO group is attached to an aromatic ring carbon atom of said $C_{6-20}$ aromatic or araliphatic hydrocarbon group;
is a substituted $C_{6-20}$ aromatic or araliphatic hydrocarbon group wherein in each group B
(1) each carbodiimide group is attached to an aromatic ring carbon atom of said $C_{6-20}$ aromatic or araliphatic hydrocarbon group, and
(2) one or two aromatic ring positions of said $C_{6-20}$ aromatic or araliphatic hydrocarbon group ortho to either or both carbodiimide groups are substituted with an aromatic substituent containing 6 to 15 carbon atoms, an aliphatic substituent containing 2 to 20 carbon atoms, or a cycloaliphatic substituent containing 5 to 20 carbon atoms, or a combination thereof; and
n is 0 to 3 (on average).

2. A process according to claim 1 wherein both aromatic ring positions ortho to each carbodiimide group attached to A, D and B are substituted with an aromatic, aliphatic or cycloaliphatic substituent or a combination thereof.

3. A process according to claim 2 wherein one aromatic ring position ortho to each carbodiimide group attached to A and B is substituted with a methyl group.

4. A process according to claim 1 wherein the sterically hindered carbodiimide is obtained form a diethyl toluene diisocyanate.

5. A process according to claim 4 wherein the diethyl toluene diisocyanate is 2,6-diethyl-1,3-diisocyanato-4-methylbenzene and 4,6-diethyl-1,3-diisocyanato-2-methylbenzene or a mixture thereof.

6. A process according to claim 2 wherein one or two aromatic ring positions ortho to each carbodiimide group attached to A, B and D is substituted with a branched aliphatic radical containing 3 to 20 carbon atoms.

7. A process according to claim 1 wherein the sterically hindered carbodiimide is obtained from a triisopropyl phenylene diisocyanate.

8. A process according to claim 7 wherein the triisopropyl phenylene diisocyanate is 2,4-diisocyanato-1,3,5-tri(1-methylethyl)benzene.

9. A process according to claim 1 wherein n is on average 0 or 1.

10. A process according to claim 1 wherein n is 0.

11. A process according to claim 1 wherein 0.2 to 8% by weight of the sterically hindered carbodiimide is used.

12. A process according to claim 1 wherein 0.5 to 5% by weight of the sterically hindered carbodiimide is used.

13. A process according to claim 1 wherein the plastic containing ester groups is a polyester polyurethane.

14. A process according to claim 13 wherein the polyester polyurethane is prepared in a multistep process by reacting the polyhydroxyl polyester in a first step with a nonstoichiometric amount (based on NCO groups) of the isocyanate-containing carbodiimide to form an intermediate that is afterwards converted to the polyester polyurethane.

15. A process according to claim 1 wherein the plastic containing ester groups is a polyterephthalate.

16. A process according to claim 15 wherein the polyterephthalate is a polybutylene terephthalate or a polyethylene terephthalate.

17. A process according to claim 15 wherein the polyterephthalate incorporate other dicarboxylic acids and/or, diols.

* * * * *